US008048954B2

(12) United States Patent
Grablowitz et al.

(10) Patent No.: US 8,048,954 B2
(45) Date of Patent: Nov. 1, 2011

(54) NON-IONICALLY HYDROPHILISED BINDING-AGENT DISPERISIONS

(75) Inventors: Hans Georg Grablowitz, Neuss (DE); Thorsten Rische, Unna (DE); Thomas Feller, Solingen (DE); Juergen Meixner, Krefeld (DE); Karin Naujoks, Odenthal (DE); Holger Casselmann, Odenthal (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/269,189

(22) Filed: Nov. 12, 2008

(65) Prior Publication Data

US 2009/0124764 A1 May 14, 2009

(30) Foreign Application Priority Data

Nov. 13, 2007 (DE) .......................... 10 2007 054 002

(51) Int. Cl.
*C08G 18/08* (2006.01)
(52) U.S. Cl. .......... 524/591; 524/589; 524/590; 528/44; 528/76; 528/85
(58) Field of Classification Search .................. 524/591, 524/589, 590; 528/44, 76, 85
See application file for complete search history.

(56) References Cited

U.S. PATENT DOCUMENTS

| 3,665,031 | A | * | 5/1972 | Peterli et al. | .................... 562/44 |
| 3,905,929 | A | | 9/1975 | Noll | |
| 4,098,933 | A | | 7/1978 | Burkhardt et al. | |
| 4,237,264 | A | | 12/1980 | Noll et al. | |
| 4,284,544 | A | | 8/1981 | Wegner et al. | |
| 5,066,732 | A | | 11/1991 | Savino et al. | |
| 5,804,647 | A | | 9/1998 | Nachtkamp et al. | |
| 6,677,400 | B2 | * | 1/2004 | Munzmay et al. | ............. 524/839 |
| 6,784,243 | B2 | * | 8/2004 | Rische et al. | ................. 524/591 |
| 7,176,254 | B2 | * | 2/2007 | Rische et al. | ................. 524/591 |
| 7,439,299 | B2 | * | 10/2008 | Coogan et al. | ................. 524/840 |
| 2003/0049457 | A1 | * | 3/2003 | Munzmay et al. | ......... 428/422.8 |
| 2006/0293468 | A1 | * | 12/2006 | Rische et al. | ................. 525/457 |

FOREIGN PATENT DOCUMENTS

| DE | 2456469 A1 | 8/1976 |
| DE | 2651506 A1 | 5/1978 |
| DE | 2853937 A1 | 7/1980 |
| EP | 0317258 A2 | 5/1989 |
| EP | 0792900 A1 | 9/1997 |

* cited by examiner

*Primary Examiner* — Milton I Cano
*Assistant Examiner* — Michael L Leonard
(74) *Attorney, Agent, or Firm* — Connolly Bove Lodge & Hutz LLP

(57) ABSTRACT

The present invention relates to aqueous non-ionically hydrophilised binding-agent dispersions based on polyurethane ureas with terminal polyethylene-oxide groups, to the preparation thereof, and to the use thereof for producing coatings.

10 Claims, No Drawings

NON-IONICALLY HYDROPHILISED BINDING-AGENT DISPERISIONS

RELATED APPLICATIONS

This application claims benefit to German Patent Application No. 10 2007 054 002.9, filed Nov. 13, 2007, which is incorporated herein by reference in its entirety for all useful purposes.

BACKGROUND OF THE INVENTION

The present invention relates to aqueous non-ionically hydrophilised binding-agent dispersions based on polyurethane ureas with terminal polyethylene-oxide groups, to the preparation thereof, and to the use thereof for producing coatings.

Coating agents that are based on polyurethanes play a major role by reason of their outstanding properties such as, for example, high scratch resistance and low-temperature flexibility. By reason of increasingly stringent ecological and other statutory regulations, particular importance is attached to the solvent-free, aqueous polyurethanes. Coatings that are based on polyurethane dispersions find use in varying applications such as, for example, textile coating, plastics lacquering and automobile lacquering. For certain applications— such as in electronics, for example—it is necessary that coatings exhibit a conductivity that is as low as possible, in order to guarantee high electrical insulation. At the same time, it is desirable that the aqueous coating agents are stable as regards coagulation within a wide temperature-range, in order to be able to apply them using the differing processes— such as, for example, spraying or blade coating—under conditions that are as variable as possible.

Stabilisation of the polyurethane particles in an aqueous phase can be effected by means of two mechanisms, either by charges on the surfaces resulting in the repulsion of the particles (ionic stabilisation), or by water-soluble or partly water-soluble oligomer chains or polymer chains that are adsorbed on the surface or covalently bonded preventing an agglomeration by virtue of van der Waals interactions. (non-ionic stabilisation). The ionic stabilisation of dispersions of such a type results in systems that are relatively insensitive to coagulation with respect to an increase in temperature but that display enhanced conductivity by virtue of the presence of ions. In the case of non-ionic stabilisation, the situation is reversed—i.e. these systems can be destabilised by temperatures higher than 60° C., as described in DE-A 26 51 506, for example. However, these systems present the disadvantage of comparatively low conductivity. In addition, it is sufficiently well-known to combine the two stabilisation mechanisms, in order to obtain ionically/non-ionically stabilised dispersions that are stable as regards coagulation within a wide temperature-range, these systems likewise exhibiting higher conductivity by reason of charges.

The non-ionic stabilisation is based on the incorporation of functional hydrophilic polyethylene oxides that are reactive with respect to isocyanate groups (abbreviated in the following as PEG), it being possible for the PEG to be linearly, laterally or terminally incorporated in the main chain of the polyurethane.

In U.S. Pat. No. 3,905,929 non-ionic polyurethane dispersions are described in which PEG chains have been attached laterally in the polyurethane dispersion. The resulting binding agents are distinguished by relatively good mechanical properties. But the PEG groups are consequently not terminally anchored, and by-products may arise during the process.

In EP-A 0 317 258 difunctional, non-ionic PEG-containing emulsifiers are disclosed which can be employed for synthesising a polyurethane dispersion. The PEG-containing hydrophilising agents described therein are likewise incorporated in bifunctionally lateral manner. Although the polyurethane dispersions produced in such a way are distinguished by relatively high thermal stability, the hydrophilising agents have to be generated in a further process step, constituting a disadvantage from the point of view of economy.

EP-A 0 792 900 describes polyurethane dispersions for use in glass-fibre sizing materials. These dispersions may have been ionically and/or non-ionically hydrophilised, the polyisocyanate consisting, in a proportion amounting to at least 50%, of 1-methyl-2,4-diisocyanatocyclohexane and/or 1-methyl-2,6-diisocyanatocyclohexane. In the dispersions mentioned therein, quantities amounting to $\leq 15$ wt. % of a non-ionic terminal hydrophilising component are employed.

In U.S. Pat. No. 5,066,732 non-ionic polyurethane dispersions are described, a monofunctional polyethylene-glycol component being converted in intermediate manner with a diisocyanate, and the reaction product subsequently being caused to react with a dihydroxyamine so as to yield a hydrophilising component. Accordingly, the polyethylene oxide is likewise anchored laterally in the polyurethane.

However, the polyurethane dispersions known from the state of the art all display inadequate stability in storage, particularly at elevated temperatures, and therefore, in addition, have a tendency to coagulate prematurely.

The object of the present invention consequently consisted in the provision of new aqueous polyurethane dispersions that exhibit a coagulation temperature of at least 75° C. and consequently possess adequate stability in storage.

The object has been achieved in accordance with the claims. Polyurethane-urea dispersions are claimed therein that in the polymer backbone exhibit monofunctional PEG-containing components having a certain molar mass and in a certain weight ratio terminally on the polyurethane chain.

EMBODIMENTS OF THE INVENTION

An embodiment of the present invention is an aqueous polyurethane-urea dispersion comprising the following structural components:
A) 10 weight % to 40 weight % of one or more aliphatic polyisocyanate compounds;
B) 40 weight % to 70 weight % of at least one polyhydroxy compound with a molar mass $M_n$ in the range of from 400 g/mol to 800 g/mol;
C) 19 weight % to 50 weight % of a monofunctional polyethylene-glycol-containing component which is reactive with respect to isocyanate groups, the polyethylene-glycol content of which component amounts to at least 50 weight % and has a molar mass $M_n$ in the range of from 1200 g/mol to 3000 g/µmol;
D) 0.5 weight % to 10 weight % of at least one polyamine compound with a molar mass $M_n$ in the range of from 32 g/mol to 400 g/mol and with a functionality of 1 or greater;
E) 0.5 weight % to 10 weight % of a polyhydroxy compound with a molar mass $M_n$ in the range of from 62 g/mol to 320 g/mol and with a functionality of 1 or greater; and
F) 0 weight % to 10 weight % of further auxiliary substances and additives;
wherein the sum of said structural components A), B), C), D), E), and F) equals 100 weight %.

Another embodiment of the present invention is the above aqueous polyurethane-urea dispersion, wherein C) is a polyoxyalkylene ether that contains only one hydroxy group or amino group.

Another embodiment of the present invention is the above aqueous polyurethane-urea dispersion, wherein C) is a polyoxyalkylene ether that contains from 50 weight % to 100 weight % of structural units derived from ethylene oxide.

Another embodiment of the present invention is the above aqueous polyurethane-urea dispersion, wherein C) is a polyoxyalkylene ether having a molar mass $M_n$ in the range of from 300 g/mol to 6000 g/mol.

Another embodiment of the present invention is the above aqueous polyurethane-urea dispersion, wherein D) is a compound selected from the group consisting of diethanolamine, hydrazine, isophoronediamine, ethylenediamine, and mixtures thereof.

Another embodiment of the present invention is the above aqueous polyurethane-urea dispersion, wherein D) is at least two compounds selected from the group consisting of diethanolamine, hydrazine, isophoronediamine, ethylenediamine, and mixtures thereof.

Another embodiment of the present invention is the above aqueous polyurethane-urea dispersion, wherein D) is a mixture of hydrazine hydrate and isophoronediamine.

Yet another embodiment of the present invention is a coating agent comprising the above aqueous polyurethane-polyurea dispersion.

Yet another embodiment of the present invention is a glass-fibre sizing material comprising the above aqueous polyurethane-polyurea dispersion.

Yet another embodiment of the present invention is a an aqueous coating agent comprising the above aqueous polyurethane-polyurea dispersion and a crosslinker selected from the group consisting of water-dispersible blocked polyisocyanates and water-soluble blocked polyisocyanates.

DESCRIPTION OF THE INVENTION

The present invention provides aqueous polyurethane-urea dispersions containing the following structural components, A) 10 wt. % to 40 wt. %, preferably 15 wt. % to 40 wt. %, particularly preferably 20 wt. % to 35 wt. %, of one or more aliphatic polyisocyanate compounds, B) 40 wt. % to 70 wt. %, preferably 42 wt. % to 63 wt. %, particularly preferably 44 wt. % to 57 wt. %, of at least one polyhydroxy compound with a molar mass $M_n$ from 400 g/mol to 8000 g/mol, C) 19 wt. % to 50 wt. %, preferably 19 wt. % to 30 wt. % and particularly preferably 19 wt. % to 25 wt. %, of a monofunctional polyethylene-glycol-containing component which is reactive with respect to isocyanate groups, the polyethylene-glycol content of which component amounts to at least 50 wt. %, preferably 70 wt. % and particularly preferably 80 wt. %, and exhibits a molar mass $M_n$ from 1200 g/mol to 3000 g/mol, preferably 1500 g/mol to 3000 g/mol and particularly preferably from 2000 g/mol to 3000 g/mol, D) 0.5 wt. % to 10 wt. %, preferably 1 wt. % to 7 wt. %, particularly preferably 2 wt. % to 5 wt. %, of at least one polyamine compound with a molar mass $M_n$ from 32 g/mol to 400 g/mol and with a functionality $\geq 1$, E) 0.5 wt. % to 10 wt. %, preferably 1 wt. % to 7 wt. %, particularly preferably 1.5 wt. % to 5 wt. %, of a polyhydroxy compound with a molar mass $M_n$ from 62 g/mol to 320 g/mol and with a functionality $\geq 1$ and also F) optionally 0 wt. % to 10 wt. %, preferably 0.5 wt. % to 7 wt. %, particularly preferably 0.5 wt. % to 5 wt. %, of further auxiliary substances and additives, the sum of the structural components from A) to F) always resulting in 100 wt. %.

Suitable polyisocyanates of component A) are the aromatic, araliphatic, aliphatic or cycloaliphatic polyisocyanates that are known as such to a person skilled in the art. Suitable polyisocyanates are, for example, 1,4-butylene diisocyanate, 1,6-hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof with arbitrary isomer content, 1,4-cyclohexylene diisocyanate, 1,4-phenylene diisocyanate, 2,4- and/or 2,6-toluylene diisocyanate, 1,5-naphthylene diisocyanate, 2,4'- or 4,4'-diphenylmethane diisocyanate, 1,3- and 1,4-bis(2-isocyanato-prop-2-yl)benzene (IMXDI), 1,3-bis(isocyanatomethyl)benzene (XDI), (S)-alkyl-2,6-diisocyanato hexanoates or (L)-alkyl-2,6-diisocyanato hexanoates.

Polyisocyanates with a functionality $\geq 2$ may also be used proportionately. These include modified diisocyanates with uretdione, isocyanurate, urethane, allophanate, biuret, iminooxadiazinedione and/or oxadiazinetrione structure and also non-modified polyisocyanates with more than 2 NCO groups per molecule, for example 4-isocyanatomethyl-1,8-octane diisocyanate (nonane triisocyanate) or triphenylmethane-4-4'-4''-triisocyanate.

It is preferably a question of polyisocyanates or polyisocyanate mixtures of the aforementioned type with exclusively aliphatically and/or cycloaliphatically bonded isocyanate groups with an average functionality from 2 to 4, preferably 2 to 2.6 and particularly preferably 2 to 2.4.

Particularly preferred are isophorone diisocyanate, the isomers of bis(4,4'-isocyanatocyclohexyl)methane and also mixtures thereof.

Polymeric polyols capable of being employed as compounds B) exhibit a molecular weight $M_n$ from 400 g/mol to 8000 g/mol, preferably from 400 g/mol to 6000 g/mol and particularly preferably from 400 g/mol to 3000 g/mol. Their hydroxyl value amounts to 22 mg KOH/g to 400 mg KOH/g, preferably 30 mg KOH/g to 300 mg KOH/g and particularly preferably 40 mg KOH/g to 250 mg KOH/g, and they exhibit an OH functionality from 1.5 to 6, preferably from 1.8 to 3 and particularly preferably from 1.9 to 2.1.

Polyols in the sense of the present invention are the organic polyhydroxyl compounds known in polyurethane-lacquer technology, such as, for example, the customary polyester polyols, polyacrylate polyols, polyurethane polyols, polycarbonate polyols, polyether polyols, polyester polyacrylate polyols and also polyurethane polyacrylate polyols, polyurethane polyester polyols, polyurethane polyether polyols, polyurethane polycarbonate polyols, polyester polycarbonate polyols, phenol/formaldehyde resins, on their own or in mixtures. Preferred are polyester polyols, polyether polyols or polycarbonate polyols; particularly preferred are polyester polyols.

By way of polyether polyols, mention may be made, for example, of the polyaddition products of the styrene oxides, of ethylene oxide, propylene oxide, tetrahydrofuran, butylene oxide, of epichlorohydrin and also their mixed-addition products and graft products, and also the polyether polyols obtained by condensation of polyhydric alcohols or mixtures of the same, and the polyether polyols obtained by alkoxylation of polyhydric alcohols, amines and amino alcohols.

Suitable hydroxyl-functional polyethers B) exhibit OH functionalities from 1.8 to 6.0, preferably 2.0 to 4.0, OH values from 50 mg KOH/g to 700 mg KOH/g, preferably from 100 mg KOH/g to 600 mg KOH/g solids, and molecular weights $M_n$ from 106 g/mol to 4000 g/mol, preferably from 200 g/μmol to 3500 g/mol, such as, for example, alkoxylation products of hydroxyl-functional initiator molecules such as ethylene glycol, propylene glycol, butanediol, hexanediol, trimethylolpropane, glycerin, pentaertythritol, sorbitol or mixtures of these and also of other hydroxyl-functional compounds with propylene oxide or butylene oxide. Preferred by way of polyether component B) are polypropylene oxide polyols with a molecular weight from 300 g/mol to 4000 g/mol. In this connection, the particularly low-molecular polyether polyols with appropriately high OH contents may be water-soluble. Particularly preferred, however, are water-insoluble polypropylene oxide polyols and polytetramethylene oxide polyols and also mixtures thereof.

Highly suitable examples of polyester polyols are the polycondensates, known as such, formed from diols and also optionally triols and tetraols and dicarboxylic and also optionally tricarboxylic and tetracarboxylic acids or hydroxycarboxylic acids or lactones. Instead of the free polycarboxylic acids, the corresponding polycarboxylic acid anhydrides or corresponding polycarboxylic acid esters of low alcohols may also be used for producing the polyesters. Examples of suitable diols are ethylene glycol, butylene glycol, diethylene glycol, triethylene glycol, polyalkylene glycols such as polyethylene glycol, furthermore 1,2-propanediol, 1,3-propanediol, butanediol(1,3), butanediol(1,4), hexanediol(1,6) and isomers, neopentyl glycol or hydroxypivalic acid neopentyl glycol ester, the three last-named compounds being preferred. To be mentioned here by way of polyols to be optionally employed concomitantly are, for example, trimethylolpropane, glycerin, erythritol, pentaerythritol, trimethylolbenzene or trishydroxyethyl isocyanurate.

By way of dicarboxylic acids, the following enter into consideration, for example: phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid, 2,2-dimethylsuccinic acid. Anhydrides of these acids can likewise be used, to the extent that they exist For the purposes of the present invention, the anhydrides are consequently encompassed by the expression "acid". Monocarboxylic acids, such as benzoic acid and hexanecarboxylic acid, may also be used, provided that the average functionality of the polyol is ≧2. Saturated aliphatic or aromatic acids are preferred, such as adipic acid or isophthalic acid. By way of polycarboxylic acid to be optionally used concomitantly in relatively small quantities, trimellitic acid may be mentioned here.

Hydroxycarboxylic acids that can be used concomitantly as co-reactants in the preparation of a polyester polyol having terminal hydroxyl groups are, for example, hydroxycaproic acid, hydroxybutyric acid, hydroxydecanoic acid, hydroxystearic acid and such like. Usable lactones are, inter alia, caprolactone, butyrolactone and homologues.

Preferred are polyester polyols B) based on butanediol and/or neopentyl glycol and/or hexanediol and/or ethylene glycol and/or diethylene glycol with adipic acid and/or phthalic acid and/or isophthalic acid. Particularly preferred are polyester polyols B) based on butanediol and/or neopentyl glycol and/or hexanediol with adipic acid and/or phthalic acid.

The polycarbonate polyols entering into consideration are obtainable by reaction of carbonic-acid derivatives, for example diphenyl carbonate, dimethyl carbonate or phosgene, with diols. Ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethylpentanediol-1,3, dipropylene glycol, polypropylene glycols, dibutylene glycol, polybutylene glycols, bisphenol A, tetrabromobisphenol A, but lactone-modified diols also enter into consideration, for example, as diols of such a type. The diol component preferably contains 40 wt. % to 100 wt. % 1,6-hexanediol and/or hexanediol derivatives, preferentially those which exhibit ether groups or ester groups in addition to terminal OH groups, for example products that are obtained by conversion of 1 mol hexanediol with at least 1 mol, preferably 1 mol to 2 mol, ε-caprolactone, or by etherification of hexanediol with itself so as to yield dihexylene glycol or trihexylene glycol. Polyether polycarbonate polyols may also be employed.

Preferred are polycarbonate polyols B) based on dimethyl carbonate and hexanediol and/or butanediol and/or caprolactone. Quite particularly preferred are polycarbonate polyols B) based on dimethyl carbonate and hexanediol and/or caprolactone.

Suitable non-ionically hydrophilising, monofunctional compounds corresponding to the definition of component C) are, for example, polyoxyalkylene ethers that contain only one hydroxy group or amino group. These polyethers contain a proportion of 50 wt. % to 100 wt. % of structural units that are derived from ethylene oxide, preferably 70 wt. % to 100 wt. % and particularly preferably 80 w. % to 100 wt. %, such as are accessible in a manner known as such by alkoxylation of the initiator molecules named under B). Alkylene oxides suitable for the alkoxylation reaction are, in particular, ethylene oxide and propylene oxide, which can be employed in the course of the alkoxylation reaction in arbitrary sequence or even in a mixture.

The molar mass $M_n$ of these structural units amounts to 1200 g/mol to 3000 g/mol, preferably 1500 g/mol to 3000 g/mol and particularly preferably 2000 g/mol to 3000 g/mol.

Suitable non-ionically hydrophilising, monofunctional compounds of such a type are, for example, monofunctional alkoxypolyethylene glycols such as, for example, methoxypolyethylene glycols (MPEG Carbowax® 2000 or Methoxy PEG-40, molecular-weight range 1800 to 2200, The Dow Chemical Company), monofunctional polyether monoalkyl ethers such as, for example, LB 25 synthesised from butanol and ethylene oxide and also propylene oxide, with an average molar mass $M_n$ of 2250 g/mol from Bayer Material Science, monofunctional polyether amines (Jeffamine® M 1000, PO/EO molar ratio 3/19 and M 2070, PO/EO molar ratio 1/31 Huntsman Corp.).

Preferably employed as C) are MPEG Carbowax® 2000, LB 25 or Jeffamine® M 2070. Particularly preferred are MPEG Carbowax® 2000 or LB 25.

The polyamines D) employed for chain lengthening are diamines or polyamines and also hydrazides, for example ethylenediamine, 1,2- and 1,3-diaminopropane, 1,4-diaminobutane, 1,6-diaminohexane, isophoronediamine, isomer mixture of 2,2,4- and 2,4,4-trimethylhexamethylenediamine, 2-methylpentamethylenediamine, diethylenetriamine, 1,3- and 1,4-xylylenediamine, α,α,α',α'-tetramethyl-1,3- and -1,4-xylylenediamine and 4,4-diaminodicyclohexylmethane, dimethylethylenediamine, hydrazine or adipic acid dihydrazide.

By way of D), in principle compounds also enter into consideration that contain active hydrogen with varying reactivity with respect to NCO groups, such as compounds that exhibit, in addition to a primary amino group, also secondary amino groups or, in addition to an amino group (primary or secondary), also OH groups. Examples of these are primary/secondary amines, such as 3-amino-1-methylaminopropane, 3-amino-1-ethylaminopropane, 3-amino-1-cyclohexylaminopropane, 3-amino-1-methylaminobutane, furthermore alkanolamines such as N-aminoethylethanolamine, ethanolamine, 3-aminopropanol or neopentanolamine. Preferred are diethanolamine and/or hydrazine and/or isophoronediamine (IPDA) and/or ethylenediamine. Particularly preferred are hydrazine and/or isophoronediamine and/or ethylenediamine. Quite particularly preferred is a mixture of hydrazine hydrate and IPDA.

As a rule, the low-molecular polyols E) employed for synthesising the polyurethane resins bring about a stiffening and/or a branching of the polymer chain. The molecular weight preferably lies between 62 and 200. Suitable polyols may contain aliphatic, alicyclic or aromatic groups. Mention may be made here, for example, of the low-molecular polyols with up to about 20 carbon atoms per molecule, such as, for example, ethylene glycol, diethylene glycol, triethylene glycol, 1,2-propanediol, 1,3-propanediol, 1,4-butanediol, 1,3-butylene glycol, cyclohexanediol, 1,4-cyclohexanedimethanol, 1,6-hexanediol, hydroquinone dihydroxyethyl ether, bisphenol A (2,2-bis(4-hydroxyphenyl)propane), hydrated bisphenol A (2,2-bis(4-hydroxycyclohexyl)propane) and also mixtures thereof, and also trimethylolpropane, glycerin or pentaerythritol. Use may also be made of ester diols such as, for example, δ-hydroxybutyl-ε-hydroxy caproic acid ester, ω-hydroxyhexyl-γ-hydroxybutyric acid ester, adipic acid-(β-hydroxyethyl)ester or terephthalic acid-bis(β-hydroxyethyl)ester. Preferred is hexanediol and/or trimethylolpropane and/or butanediol. Particularly preferred are trimethylolpropane and/or butanediol.

Further auxiliary substances or additives F) may optionally be employed concomitantly, by the latter being dissolved in the aqueous, continuous phase subsequent to the production of the aqueous polyurethane dispersion, or by being added prior to dispersal, dissolved in the organic phase, and hence being co-dispersed. Suitable auxiliary substances or additives are, for example, anti-oxidants, UV stabilisers, flow-control agents, biocides, anti-static agents or adhesion-promoters.

For the purpose of producing the PUR dispersions according to the invention, use may be made of all the processes known from the state of the art, such as, for example, the prepolymer mixing process, the acetone process or the melt dispersing process. The PUR dispersion is preferably produced by the acetone process.

For the production of the PUR dispersion by the acetone process, ordinarily the constituents A), B), C), E) and optionally F), which must not exhibit any primary or secondary amino groups, and the polyisocyanate component A) for producing an isocyanate-functional polyurethane prepolymer are submitted wholly or partially and optionally diluted with a solvent that is miscible with water but inert with respect to isocyanate groups and are heated up to temperatures within the range from 50° C. to 120° C. For the purpose of accelerating the isocyanate addition reaction, the catalysts known in polyurethane chemistry may be employed. Dibutyltin dilaurate is preferred.

Suitable solvents are the customary aliphatic, keto-functional solvents such as, for example, acetone, butanone, which may be added not only at the start of the production but optionally also later in portions. Preferred are acetone and butanone.

Subsequently constituents A)-F) optionally not yet added at the start of the reaction are added in metered amounts.

In the course of the production of the polyurethane prepolymer the mole ratio of isocyanate groups to groups reactive with isocyanate amounts to 1.0 to 3.5, preferably 1.1 to 3.0, particularly preferably 1.1 to 2.5.

The conversion of components A), B), C) and B) to the prepolymer is effected partially or totally, but preferably totally. In this way, polyurethane prepolymers that contain free isocyanate groups are obtained in bulk or in solution.

Subsequent to this, in a further process step the prepolymer obtained is dissolved with the aid of aliphatic ketones such as acetone or butanone if this has not yet happened or has only partially happened.

Subsequently, possible $NH_2$-functional and/or NH-functional components are converted with the isocyanate groups still remaining. This chain lengthening/termination may be carried out either in solvent prior to the dispersing, during the dispersing, or in water after the dispersing. The chain lengthening is preferably carried out prior to the dispersal in water.

If compounds corresponding to the definition of D) with $NH_2$ groups or NH groups are employed for chain lengthening, the chain lengthening of the prepolymers is preferably effected prior to the dispersal.

The degree of chain lengthening—that is to say, the equivalent ratio of NCO-reactive groups of the compounds employed for chain lengthening to free NCO groups of the prepolymer—is between 40% and 100%, preferably between 60% and 100%, particularly preferably between 70% and 100%.

The aminic components D) may optionally be employed individually or in mixtures in water-diluted or solvent-diluted form in the process according to the invention, whereby in principle any sequence of addition is possible.

If water or organic solvents is/are used concomitantly as diluent(s), the diluent content preferably amounts to 70 wt. % to 95 wt. %.

Production of the PUR dispersion from the prepolymers is undertaken subsequent to the chain lengthening. To this end, the dissolved and chain-lengthened polyurethane polymer—optionally subject to strong shear such as, for example, vigorous stirring—is either charged into the dispersing water or, conversely, the dispersing water is stirred into the prepolymer solutions. The water is preferably added into the dissolved prepolymer.

Ordinarily, the solvent still contained in the dispersions after the dispersing step is subsequently removed by distillation. Removal already during the dispersal is likewise possible.

The solids content of the polyurethane-polyurea dispersion according to the invention is between 20 wt. % and 70 wt. %, preferably between 30 wt. % and 65 wt. % and particularly preferably between 35 wt. % and 62 wt. %.

The invention further provides the use of the polyurethane-polyurea dispersions according to the invention for producing coating agents, preferably for producing glass-fibre sizing materials.

Suitable substrates are, for example, plastics, metals and glass. The polyurethane dispersions according to the invention may likewise be employed in combination with crosslinking, aqueous, blocked polyisocyanates and may be processed into glass-fibre sizing materials.

The present invention also provides aqueous coating agents containing the polyurethane-polyurea dispersion according to the invention as well as a crosslinker selected from the group of water-dispersible or water-soluble blocked polyisocyanates.

By way of crosslinker, use is made of blocked polyisocyanates which are optionally present in water-dispersible or water-soluble form or are employed in the form of an aqueous dispersion or solution. The blocked polyisocyanates exhibit an (average) NCO functionality from 2.0 to 5.0, preferably from 2.3 to 4.5, a content of isocyanate groups (unblocked and blocked) from 5.0 wt. % to 27.0 wt. %, preferably from 14.0 wt. % to 24.0 wt. %, and a content of monomeric diisocyanates of less than 1 wt. %, preferably less than 0.5 wt. %. The isocyanate groups of the polyisocyanates of the water-dispersible or water-soluble blocked polyisocyanates are present in blocked form in a proportion amounting to at least 50%, preferably at least 60% and particularly preferably at least 70%. Production of the water-dispersible, blocked polyisocyanates II) can be effected by known methods pertaining to the state of the art (e.g. as described in DE-A 2 456 469, columns 7-8, Examples 1-5 and DE-A 2 853 937, pp 21-26, Examples 1-9).

The aqueous coating agents according to the invention may contain auxiliary substances and additives as a further component. These may be adhesion-promoters, lubricants, antistatic agents, but also the lacquer additives well known as such to a person skilled in the art, such as dyestuffs, pigments, flow-control agents, light-screening agents and anti-ageing agents, as well as UV absorbers By way of adhesion-promoters, the known silane adhesion-promoters may be employed, such as 3-aminopropyltrimethoxysilane, aminopropyltriethoxysilane, N-(2-aminoethyl)-3-aminopropyltrimethoxysilane, 3-glycidylpropyltrimethoxysilane, vinyltrimethoxysilane, vinyltriethoxysilane or 3-methacryloxypropyltriethoxysilane.

Furthermore, the coating agents according to the invention may contain one or more non-ionic and/or ionic lubricants, such as polyalkylene glycol ethers of fatty alcohols or fatty amines, polyalkylene glycol ethers and glycerin esters of fatty acids with 12 to 18 carbon atoms, polyalkylene glycols, higher fatty amides with 12 to 18 carbon atoms of polyalkylene glycols and/or alkylene amines, quaternary nitrogen compounds, for example ethoxylated imidazolinium salts, mineral oils or waxes.

The coating agents according to the invention may also contain one or more anti-static agents. To be mentioned as examples are lithium chloride, ammonium chloride, Cr(III) salts, organic titanium compounds, aralalkyl sulfates or sulfonates, aryl polyglycol ether sulfonates or quaternary nitrogen compounds.

Production of the coating agents may be effected by the methods known as such. Preferably water is submitted in a suitable mixing vessel and, subject to stirring, the binding agent, the curing agent and subsequently the lubricant and optionally further auxiliaries are added. Then the pH value is adjusted to 5-7, and a hydrolysate of an adhesion-promoter is added. After a further stirring-time of 15 minutes the coating agent is ready for use and may optionally be applied after adaptation of the pH value.

The coating agents, preferably employed in the form of sizing-material compositions, may be applied onto a suitable substrate with the aid of arbitrary methods, for example by means of spray applicators or roll applicators, and cured.

Both the known types of glass used for the manufacture of glass silk, such as E-glass, A-glass, C-glass and S-glass according to DIN 1259-1, and the other products of the glass-fibre manufacturer, known as such, are suitable for the sized glass fibres. Among the named types of glass for the production of continuous glass fibres, the E-glass fibres possess the greatest importance for the reinforcement of plastics, by reason of their freedom from alkali, their high tensile strength and high modulus of elasticity.

The process for production, the process of sizing, and the reworking of the glass fibres are known and are described, for example, in K. L. Loewenstein: "The Manufacturing Technology of Continuous Glass Fibres", Elsevier Scientific Publishing Corp., Amsterdam, London, New York, 1983.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Measurement of conductivity: The measurement of the conductivity of the dispersions is undertaken with a conductivity meter manufactured by Knick, type 703.

Determination of the coagulation temperature: For this purpose, 50 mL of the dispersion are brought into a flask provided with a stirrer and are heated up at a rate of 2° C./min, subject to stirring. The temperature at which a gelling of the dispersion occurs is specified.

Materials employed:

Impranil® DLU: anionic/non-ionic aliphatic polycarbonate-polyether-polyurethane dispersion with a solids content of 60% (Bayer MaterialScience AG, DE).

Impranil® DLS: anionic/non-ionic aliphatic polycarbonate-polyether-polyurethane dispersion with a solids content of 50% (Bayer Material Science AG, DE).

Impranil® DLN: anionic aliphatic polyester polyurethane dispersion with a solids content of 50% (Bayer Material Science AG, DE).

Desmodur® H: 1,6-hexamethylene diisocyanate (HDI), (Bayer MaterialScience AG, DE).

Desmophen® PE 170 HN: polyester formed from adipic acid, hexanediol and neopentyl glycol, OH value 66, $M_n$=1700 gmol$^{-1}$ ((Bayer MaterialScience AG, Leverkusen).

Polyether LB 25: monofunctional polyether based on ethylene oxide and propylene oxide with an ethylene-oxide proportion of 84%, OH value 25, $M_n$=2250 gmol$^{-1}$ (Bayer MaterialScience AG, DE).

MPEG2000: polyethylene glycol monomethyl ether, CAS No. 9004-74-4, monofunctional, with a molar mass of 2000 gmol$^{-1}$ (Fluka).

MPEG1000: polyethylene glycol monomethyl ether, CAS No. 9004-74-4, monofunctional, with a molar mass of 1000 gmol$^{-1}$ (Fluka).

MPEG550: poly(ethylene glycol) monomethyl ether, CAS No. 9004-74-4, monofunctional, with a molar mass of 550 gmol$^{-1}$ (Fluka).

PEG2000: polyethylene glycol, CAS No. 25322-68-3, difunctional, with a molar mass of 2000 gmol$^{-1}$ (Sigma-Aldrich).

Tegomer® D3403: polyethylene glycol (lateral), difunctional, with a molar mass of 1200 gmol$^{-1}$ (Tego Chemie Service GmbH, Essen).

IPDA 1-amino-3,3,5-trimethyl-5-aminomethylcyclohexane, isophoronediamine (Bayer MaterialScience AG, DE).

HyHy hydrazine hydrate, $H_2N$—$NH_2$ (Bayer Material Science AG, DE)

BDO 1,4-butanediol (Bayer MaterialScience AG, DE)

Production of the Dispersions:

Example 1

According to the Invention 209 g of the polyester polyol PE 170 HN and 75 g of the monofunctional hydrophilising agent LB25 are added to 68 g HDI at 50° C. and subsequently converted at 100° C. to the prepolymer until the theoretical NCO value (NCO-1=6.43%) is attained. Then 7.6 g butanediol are added and stirred further at 50° C. until such time as the NCO value is constant (NCO-2). Thereupon 641 g acetone are supplied and cooled to 40° C. Within 20 min, 520 g water are added dropwise to the dispersion, subject to vigorous stirring. On the basis of NCO-2, a mixture of hydrazine hydrate and IPDA in 177 g water is added within 5 min for the purpose of chain lengthening, so that 46% of the remaining NCO groups are caused to react by the hydrazine hydrate, and 45% by the IPDA. The mixture is stirred further for 5 min. Subsequently the acetone is distilled off at 120 mbar at 40° C. An aqueous dispersion arises with a solids content of 34.7% and with a viscosity of 537 mPas, a pH value of 5.8 and an average particle size of 580 nm.

Example 2

According to the Invention 211 g of the polyester polyol PE 170 HN and 76.4 g of the monofunctional hydrophilising agent MPEG2000 are added to 70.6 g HDI at 50° C. and subsequently converted at 100° C. to the prepolymer until the theoretical NCO value NCO-1=6.50%) is attained. Then 7.8 g butanediol are added and stirred further at 50° C. until such time as the NCO value is constant (NCO-2). Thereupon 650.1 g acetone are supplied and cooled to 40° C. Within 20 min, 526 g water are added dropwise to the dispersion, subject to vigorous stirring. On the basis of NCO-2, a mixture of hydrazine hydrate and IPDA in 181 g water is added within 5 min for the purpose of chain lengthening, so that 46% of the remaining NCO groups are caused to react by the hydrazine hydrate, and 45% by the IPDA. The mixture is stirred further for 5 min. Subsequently the acetone is distilled off at 120 mbar at 40° C. An aqueous dispersion arises with a solids content of 36.0% and with a viscosity of 560 mPas, a pH value of 5.7 and an average particle size of 102 nm.

Example 3

According to the Invention 214.4 g of the polyester polyol PE 170 HN and 72.4 g of the monofunctional hydrophilising agent LB25 are added to 70.46 g HDI at 50° C. and subsequently converted at 100° C. to the prepolymer until the theoretical NCO value (NCO-=6.51%) is attained. Then 7.8 g butanediol are added and stirred further at 50° C. until such time as the NCO value is constant (NCO-2). Thereupon 649 g acetone are supplied and cooled to 40° C. Within 20 min, 524 g water are added dropwise to the dispersion, subject to vigorous stirring. On the basis of NCO-2, a mixture of hydrazine hydrate and IPDA in 181 g water is added within 5 min for the purpose of chain lengthening, so that 46% of the remaining NCO groups are caused to react by the hydrazine hydrate, and 45% by the IPDA. The mixture is stirred further for 5 min. Subsequently the acetone is distilled off at 120 mbar at 40° C. An aqueous dispersion arises with a solids content of 34.9% and with a viscosity of 423 mPas, a pH value of 6.0 and an average particle size of 650 nm.

Example 4

Comparative Example 214 g of the polyester polyol PE 170 HN and 63.1 g of the monofunctional hydrophilising agent LB25 are added to 70.0 g HDI at 50° C. and subsequently converted to the prepolymer until the theoretical NCO value (NCO-1=6.69%) is attained. Then 7.8 g butanediol are added and stirred further at 50° C. until such time as the NCO value is constant (NCO-2). Thereupon 632 g acetone are supplied and cooled to 40° C. Within 20 min, 507 g water are added dropwise to the dispersion, subject to vigorous stirring. On the basis of NCO-2, a mixture of hydrazine hydrate and IPDA in 181 g water is added within 5 min for the purpose of chain lengthening, so that 46% of the remaining NCO groups are caused to react by the hydrazine hydrate, and 45% by the IPDA. The mixture is stirred further for 5 min. Subsequently the acetone is distilled off at 120 mbar at 40° C. An aqueous dispersion arises with a solids content of 33.1% and with a viscosity of 395 mPas, a pH value of 6.2 and an average particle size of 880 nm.

Example 5

Comparative Example 225.1 g of the polyester polyol PE 170 HN and 57.0 g of the monofunctional hydrophilising agent LB25 are added to 73.2 g HDI at 50° C. and subsequently converted at 100° C. to the prepolymer until the theoretical NCO value (NCO-1=6.87%/0) is attained. Then 8.2 g butanediol are added and stirred further at 50° C. until such time as the NCO value is constant NCO-2). Thereupon 646 g acetone are supplied and cooled to 40° C. Within 20 min, 514 g water are added dropwise to the dispersion, subject to vigorous stirring. On the basis of NCO-2, a mixture of hydrazine hydrate and IPDA in 190 g water is added within 5 min for the purpose of chain lengthening, so that 46% of the remaining NCO groups are caused to react by the hydrazine hydrate, and 45% by the IPDA. The mixture is stirred further for 5 min. Subsequently the acetone is distilled off at 120 mbar at 40° C. An aqueous dispersion arises with a solids content of 37.2% and with a viscosity of 96 mPas, a pH value of 5.8 and an average particle size of 1800 nm, which has a strong tendency towards sedimentation.

Example 6

Comparative Example 193.5 g of the polyester polyol PE 170 HN and 73.1 g of the monofunctional hydrophilising agent MPEG1000 are added to 74.2 g HDI at 50° C. and subsequently converted at 100° C. to the prepolymer until the theoretical NCO value (NCO-1=7.17%) is attained. Then 8.2 g butanediol are added and stirred further at 50° C. until such time as the NCO value is constant (NCO-2). Thereupon 620 g acetone are supplied and cooled to 40° C. Within 20 min, 487 g water are added dropwise to the dispersion, subject to vigorous stirring. On the basis of NCO-2, a mixture of hydrazine hydrate and IPDA in 190 g water is added within 5 min for the purpose of chain lengthening, so that 46% of the remaining NCO groups are caused to react by the hydrazine hydrate, and 45% by the IPDA. The mixture is stirred further for 5 min. Subsequently the acetone is distilled off at 120 mbar at 40° C. An aqueous dispersion arises with a solids content of 32.3% and with a viscosity of 71 mPas, a pH value of 7.1 and an average particle size of 230 nm.

Example 7

Comparative Example 202.7 g of the polyester polyol PE 170 HN and 76.6 g of the bifunctional hydrophilising agent PEG2000 are added to 77.6 g HDI at 50° C. and subsequently converted at 100° C. to the prepolymer until the theoretical NCO value (NCO-1=7.17%) is attained. Then 8.6 g butanediol are added and stirred further at 50° C. until such time as the NCO value is constant (NCO-2). Thereupon 645 g acetone are supplied and cooled to 40° C. Within 20 min, 510 g water are added dropwise to the dispersion, subject to vigorous stirring. On the basis of NCO-2, a mixture of hydrazine hydrate and IPDA in 199 g water is added within 5 min for the purpose of chain lengthening, so that 46% of the remaining NCO groups are caused to react by the hydrazine hydrate, and 45% by the IPDA. The mixture is stirred further for 5 min. Subsequently the acetone is distilled off at 120 mbar at 40° C. An already partially coagulated dispersion is obtained which will not be characterised in any detail.

Example 8

Comparative Example 186.6 g of the polyester polyol PE 170 HN and 76.2 g of the monofunctional hydrophilising agent MPEG550 are added to 88.2 g HDI at 50° C. and subsequently converted at 100° C. to the prepolymer until the theoretical NCO value (NCO-1=8.07%) is attained. Then 9.3 g butanediol are added and stirred further at 50° C. until such time as the NCO value is constant (NCO-2). Thereupon 641 g acetone are supplied and cooled to 40° C. Within 20 min, 478 g water are added dropwise to the dispersion, subject to vigorous stirring. On the basis of NCO-2, a mixture of hydrazine hydrate and IPDA in 227 g water is added within 5 min for the purpose of chain lengthening, so that 46% of the remaining NCO groups are caused to react by the hydrazine hydrate, and 45% by the IPDA. The mixture is stirred further for 5 min. Subsequently the acetone is distilled off at 120 mbar at 40° C. An aqueous dispersion arises with a solids content of 29.7% and with a viscosity of 107 mPas, a pH value of 5.5 and an average particle size of 99 nm.

Example 9

Comparative Example 186 g of the polyester polyol PE 170 HN and 74.9 g of the bifunctional hydrophilising agent Tegomer D3403 are added to 84.7 g HDI at 50° C. and subsequently converted at 100° C. to the prepolymer until the theoretical NCO value (NCO-1=8.07%) is attained. Then 9.3 g butanediol are added and stirred further at 50° C. until such time as the NCO value is constant (NCO-2). Thereupon 631 g acetone are supplied and cooled to 40° C. Within 20 min, 475 g water are added dropwise to the dispersion, subject to vigorous stirring. On the basis of NCO-2, a mixture of hydrazine hydrate and IPDA in 218 g water is added within 5 min for the purpose of chain lengthening, so that 46% of the remaining NCO groups are caused to react by the hydrazine hydrate, and 45% by the IPDA. The mixture is stirred further for 5 min. Subsequently the acetone is distilled off at 120 mbar at 40° C. An aqueous dispersion arises with a solids content of 34.9% and with a viscosity of 320 mPas, a pH value of 5.4 and an average particle size of 277 nm.

Tables of Results

TABLE 1

Summary of aqueous polyurethane dispersions used and produced

| Experiment | Stabilisation | Hydrophilisation | Conc./wt. % | Score | Molar mass |
|---|---|---|---|---|---|
| Impranil® DLN* | anionic | x | X | x | x |
| Impranil® DLS* | anionic/non-ionic | x | X | x | x |
| Impranil® DLU* | anionic/non-ionic | x | X | x | x |
| 1 | non-ionic | LB25 | 20 | 1 | 2250 |
| 2 | non-ionic | MPEG | 20 | 1 | 2000 |
| 3 | non-ionic | LB25 | 19 | 1 | 2250 |
| 4* | non-ionic | LB25 | 17 | 1 | 2250 |
| 5* | non-ionic | LB25 | 15 | 1 | 2250 |
| 6* | non-ionic | MPEG | 20 | 1 | 1000 |
| 7* | non-ionic | PEG | 20 | 2 | 2000 |
| 8* | non-ionic | MPEG | 20 | 1 | 550 |
| 9* | non-ionic | D3403 | 20 | 2 | 1200 |

*Comparative examples

TABLE 2

Ascertained coagulation temperatures and conductivities of the polyurethane dispersions

| Experiment | Coag. Temp./° C. | Conductivity/μS/cm |
|---|---|---|
| Impranil ® DLN* | >80 | 1702 |
| Impranil ® DLS* | >75 | 620 |
| Impranil ® DLU* | >75 | 855 |
| 1 | >75 | 150 |
| 2 | >75 | 107 |
| 3 | >75 | 87 |
| 4* | 68 | 91 |
| 5* | 62 | 105 |
| 6* | 72 | 136 |
| 7* | no dispersion | no dispersion |
| 8* | 52 | 112 |
| 9* | 67 | 96 |

*Comparative examples
It can be clearly discerned that the dispersions according to the invention exhibit a coagulation temperature >75° C. with simultaneous low conductivity.

The invention claimed is:
1. An aqueous polyurethane-urea dispersion consisting of the following structural components:
   A) 10 weight % to 40 weight % of one or more aliphatic polyisocyanate compounds;
   B) 40 weight % to 70 weight % of at least one polyhydroxy compound with a molar mass $M_n$ in the range of from 400 g/mol to 8000 g/mol;
   C) 19 weight % to 50 weight % of a monofunctional polyethylene-glycol-containing component which is reactive with respect to isocyanate groups, the polyethylene-glycol content of which component amounts to at least 50 weight % and has a molar mass $M_n$ in the range of from 1200 g/mol to 3000 g/mol;
   D) 0.5 weight % to 10 weight % of at least one compound selected from the group consisting of ethylenediamine, 1,2-diaminopropane, 1,3-diaminopropane, 1,4-diaminobutane, 1,6-diaminohexane, isophoronediamine, isomer mixture of 2,2,4- and 2,4,4-trimethylhexamethylenediamine, 2-methylpentamethylenediamine, diethylenetriamine, 1,3- xylylenediamine, 1,4-xylylenediamine, α,α,α',α'-tetramethyl-1,3- xylylenediamine, 1,4-xylylenediamine, 4,4-diaminodicyclohexylmethane, dimethylethylenediamine, hydrazine, adipic acid dihydrazide, 3-amino-1-methylaminopropane, 3-amino-1-ethylaminopropane, 3-amino-1-cyclohexylaminopropane, 3-amino-l-methylaminobutane, N-aminoethylethanolamine, ethanolamine, 3-aminopropanol, neopentanolamine, and diethanolamine;

E) 0.5 weight % to 10 weight % of a polyhydroxy compound with a molar mass $M_n$ in the range of from 62 g/mol to 320 g/mol and with a functionality of 1 or greater; and F) 0 weight % to 10 weight % of one or more auxiliary substances or additives selected from the group consisting of anti-oxidants, UV stabilisers, flow-control agents, biocides, anti-static agents, adhesion promoters, or mixtures thereof;

wherein the sum of said structural components A), B), C), D), E), and F) equals 100 weight %.

2. The aqueous polyurethane-urea dispersion of claim 1, wherein C) is a polyoxyalkylene ether that contains only one hydroxy group or amino group.

3. The aqueous polyurethane-urea dispersion of claim 1, wherein C) is a polyoxyalkylene ether that contains from 50 weight % to 100 weight % of structural units derived from ethylene oxide.

4. The aqueous polyurethane-urea dispersion of claim 1, wherein C) is a polyoxyalkylene ether having a molar mass $M_n$ in the range of from 1500 g/mol to 3000 g/mol.

5. The aqueous polyurethane-urea dispersion of claim 1, wherein D) is a compound selected from the group consisting of diethanolamine, hydrazine, isophoronediamine, ethylenediamine, and mixtures thereof.

6. The aqueous polyurethane-urea dispersion of claim 1, wherein D) is at least two compounds selected from the group consisting of diethanolamine, hydrazine, isophoronediamine, ethylenediamine, and mixtures thereof.

7. The aqueous polyurethane-urea dispersion of claim 1, wherein D) is a mixture of hydrazine hydrate and isophoronediamine.

8. A coating agent comprising the aqueous polyurethane-polyurea dispersion of claim 1.

9. A glass-fibre sizing material comprising the aqueous polyurethane-polyurea dispersion of claim 1.

10. An aqueous coating agent comprising the aqueous polyurethane-polyurea dispersion of claim 1 and a crosslinker selected from the group consisting of water-dispersible blocked polyisocyanates and water-soluble blocked polyisocyanates.

* * * * *